US008103022B2

(12) United States Patent
Kong et al.

(10) Patent No.: US 8,103,022 B2
(45) Date of Patent: Jan. 24, 2012

(54) METHOD AND SYSTEM FOR DETECTING, AND CONTROLLING POWER FOR, AN AUXILIARY MICROPHONE

(75) Inventors: Hongwei Kong, Denville, NJ (US); Nelson Sollenberger, Farmingdale, NJ (US); Li Fung Chang, Holmdel, NJ (US); Andy Tong, Redwood City, CA (US); Todd L. Brooks, Laguna Beach, CA (US); Claude Hayek, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1455 days.

(21) Appl. No.: 11/565,576

(22) Filed: Nov. 30, 2006

(65) Prior Publication Data

US 2008/0130913 A1 Jun. 5, 2008

(51) Int. Cl.
*H04R 3/00* (2006.01)
*H04B 1/38* (2006.01)

(52) U.S. Cl. ........................................ 381/111; 455/574

(58) Field of Classification Search .................... 700/94; 381/77, 81, 85, 111–115, 123; 379/387.01, 379/422; 455/574
See application file for complete search history.

(56) References Cited

U.S. PATENT DOCUMENTS 5,832,075 A * 11/1998 Gancarcik ..................... 379/377
7,536,004 B2 * 5/2009 Moquin .................. 379/387.01

* cited by examiner

*Primary Examiner* — Ping Lee
(74) *Attorney, Agent, or Firm* — McAndrews, Held & Malloy, Ltd.

(57) ABSTRACT

Methods and systems for detecting, and controlling power for, an auxiliary microphone are disclosed. Aspects of one method may include a detection block intermittently enabling a bias circuit block to provide a bias signal to determine if an auxiliary microphone may be communicatively coupled to a mobile device. The detection block may process 1-bit digital samples received from the bias circuit bock to determine whether the auxiliary microphone may be communicatively coupled. The detection block may also process the 1-bit digital samples to determine if a button associated with the auxiliary microphone may have been pushed or activated.

18 Claims, 11 Drawing Sheets

METHOD AND SYSTEM FOR DETECTING, AND CONTROLLING POWER FOR, AN AUXILIARY MICROPHONE

CROSS-REFERENCE TO RELATED APPLICATIONS/INCORPORATION BY REFERENCE

This application makes reference to:

U.S. patent application Ser. No. 11/565,414 filed on even date herewith;

U.S. patent application Ser. No. 11/565,342 filed on even date herewith; and

U.S. patent application Ser. No. 11/565,373 filed on even date herewith;

U.S. patent application Ser. No. 11/565,358 filed on even date herewith; and

U.S. patent application Ser. No. 11/565,591 filed on even date herewith.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing signals at a wireless mobile terminal. More specifically, certain embodiments of the invention relate to a method and system for detecting, and controlling power for, an auxiliary microphone.

BACKGROUND OF THE INVENTION

In audio applications, systems that provide audio interface and processing capabilities may be required to support duplex operations, which may comprise the ability to collect audio information through a sensor, microphone, or other type of input device while at the same time being able to drive a speaker, earpiece of other type of output device with processed audio signal. In order to carry out these operations, these systems may utilize audio coding and decoding (codec) devices that provide appropriate gain, filtering, and/or analog-to-digital conversion in the uplink direction to circuitry and/or software that provides audio processing and may also provide appropriate gain, filtering, and/or digital-to-analog conversion in the downlink direction to the output devices.

As audio applications expand, such as new voice and/or audio compression techniques and formats, for example, and as they become embedded into wireless systems, such as mobile phones, for example, novel codec devices may be needed that may provide appropriate processing capabilities to handle the wide range of audio signals and audio signal sources. In this regard, added functionalities and/or capabilities may also be needed to provide users with the flexibilities that new communication and multimedia technologies provide. Moreover, these added functionalities and/or capabilities may need to be implemented in an efficient and flexible manner given the complexity in operational requirements, communication technologies, and the wide range of audio signal sources that may be supported by mobile phones. In addition, more complex designs require more flexible and efficient testing interfaces and capabilities to be included as part of the design, which may allow the designer and the OEM to conduct testing of the product on a scale that may not have been achieved before.

However, as more functionalities are added to a chip and/or a system, more power may be needed for operation of the chip and/or the system. This may be problematic, especially for a mobile device that may depend on battery power. One way to reduce power drain may be to allow a user to specifically enable and disable a particular functionality as needed. However, if a user forgets to disable a functionality, then the original problem of excessive power drain may still be present.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for detecting, and controlling power for, an auxiliary microphone, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting, and controlling power for, an auxiliary microphone. Aspects of the method may comprise a detection block intermittently enabling a bias circuit block to provide a bias signal to determine if an auxiliary microphone may be communicatively coupled to a mobile device. The detection block may process 1-bit digital samples received from the bias circuit block to determine whether the auxiliary microphone may be plugged in. The detection block may also process the 1-bit digital samples to determine if a button associated with the auxiliary microphone may have been pushed or otherwise activated.

Figure 1:
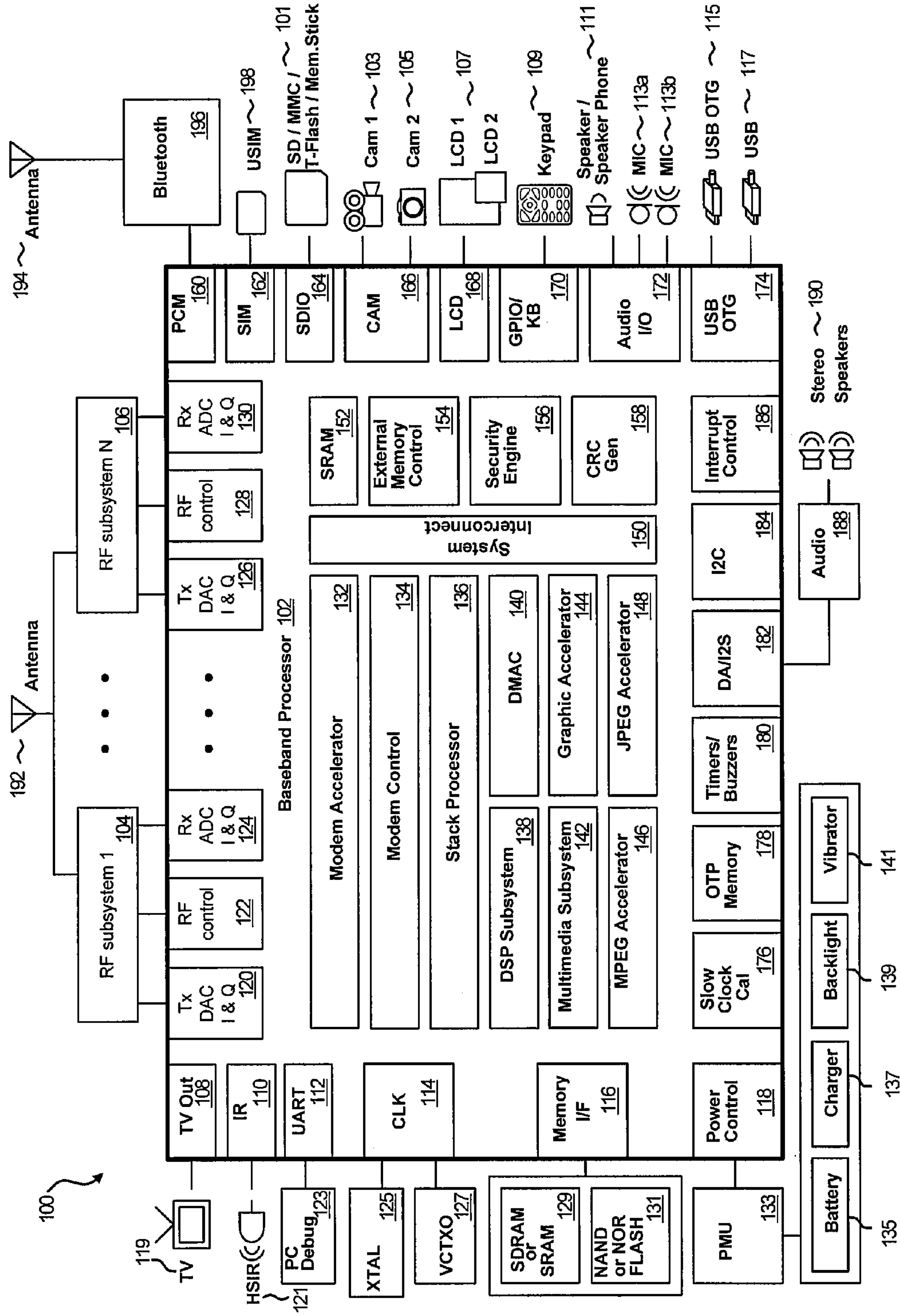
FIG. 1 is a block diagram that illustrates an exemplary multimedia baseband processor that enables handling of a plurality of wireless protocols, which may be utilized in connection with an embodiment of the invention.

FIG. 1 is a block diagram that illustrates an exemplary multimedia baseband processor that enables handling of a plurality of wireless protocols, which may be utilized in connection with an embodiment of the invention. Referring to FIG. 1, there is shown a wireless system 100 that may correspond to a wireless handheld device, for example. In this regard, the U.S. application Ser. No. 11/354,704, filed Feb. 14, 2006, discloses a method and system for a processor that handles a plurality of wireless access communication protocols, and is hereby incorporated herein by reference in its entirety. The wireless system 100 may comprise a baseband processor 102 and a plurality of RF subsystems 104, . . . , 106. In this regard, an RF subsystem may correspond to a WCDMA/HSDPA RF subsystem or to a GSM/GPRS/EDGE RF subsystem, for example. The wireless system 100 may also comprise a Bluetooth radio 196, a plurality of antennas 192 and 194, a TV 119, a high-speed infra-red (HSIR) 121, a PC debug block 123, a plurality of crystal oscillators 125 and 127, a SDRAM block 129, a NAND block 131, a power management unit (PMU) 133, a battery 135, a charger 137, a backlight 139, and a vibrator 141. The Bluetooth radio 196 may be coupled to an antenna 194. The Bluetooth radio 196 may be integrated within a single chip. The wireless system 100 may further comprise an audio block 188, one or more speakers such as speakers 190, one or more USB devices such as of USB devices 117 and 119, a microphone (MIC) 113, a speaker phone 111, a keypad 109, a plurality of LCD's 107, one or more cameras such as cameras 103 and 105, removable memory such as a memory stick 101, and a UMTS subscriber identification module (USIM) 198.

The baseband processor 102 may comprise a TV out block 108, an infrared (IR) block 110, a universal asynchronous receiver/transmitter (UART) 112, a clock (CLK) 114, a memory interface 116, a power control block 118, a slow clock block 176, an OTP memory block 178, a timers block 180, an inter-integrated circuit sound (I2S) interface block 182, an inter-integrated circuit (I2C) interface block 184, an interrupt control block 186. The baseband processor 102 may further comprise a USB on-the-go (OTG) block 174, an audio input/output interface block 172, a general-purpose I/O (GPIO) block 170, a LCD block 168, a camera block 166, a SDIO block 164, a SIM interface 162, and a pulse code modulation (PCM) block 160. The baseband processor 102 may communicate with the Bluetooth radio 196 via the PCM block 160, and in some instances, via the UART 112 and/or the I2S block 182, for example.

The baseband processor 102 may further comprise a plurality of transmit (TX) digital-to-analog converter (DAC) for in-phase (I) and quadrature (Q) signal components 120, . . . , 126, plurality of RF control 122, . . . , 128, and a plurality of receive (Rx) analog-to-digital converter (ADC) for I and Q signal components 124, . . . , 130. In this regard, receive, control, and/or transmit operations may be based on the type of transmission technology, such as EDGE, HSDPA, and/or WCDMA, for example. The baseband processor 602 may also comprise an SRAM block 152, an external memory control block 154, a security engine block 156, a CRC generator block 158, a system interconnect 150, a modem accelerator 132, a modem control block 134, a stack processor block 136, a DSP subsystem 138, a DMAC block 140, a multimedia subsystem 142, a graphic accelerator 144, an MPEG accelerator 146, and a JPEG accelerator 148. Notwithstanding the wireless system 100 disclosed in FIG. 1, aspects of the invention need not be so limited.

Figure 2A:
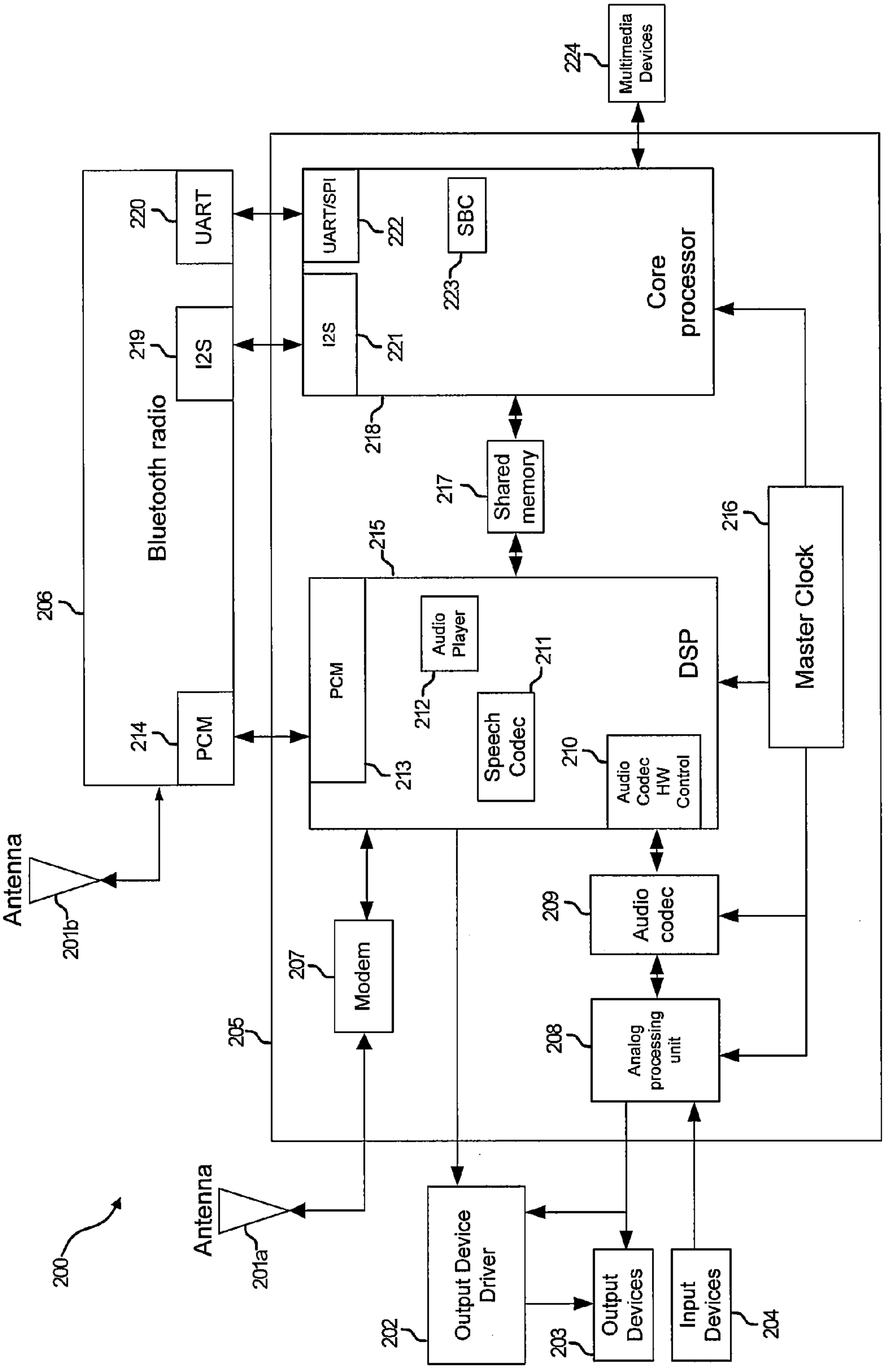
FIG. 2A is a block diagram illustrating an exemplary multimedia baseband processor communicatively coupled to a Bluetooth radio, which may be utilized in connection with an embodiment of the invention.

FIG. 2A is a block diagram illustrating an exemplary multimedia baseband processor communicatively coupled to a Bluetooth radio, which may be utilized in connection with an embodiment of the invention. Referring to FIG. 2A, there is shown a wireless system 200 that may comprise a baseband processor 205, antennas 201*a* and 201*b*, a Bluetooth radio 206, an output device driver 202, output devices s203, input devices 204, and multimedia devices 224. The wireless system 200 may comprise similar components as those disclosed for the wireless system 100 in FIG. 1. The baseband processor 205 may comprise a modem 207, a digital signal processor (DSP) 215, a shared memory 217, a core processor 218, a speech coder/decoder unit (codec) 209, an analog processing unit 208, and a master clock 216. The core processor 218 may be, for example, an ARM processor integrated within the baseband processor 205. The DSP 215 may comprise a speech codec 211, an audio player 212, a PCM block 213, and an audio codec hardware control 210. The core processor 218 may comprise an I2S block 221, a UART and serial peripheral interface (UART/SPI) block 222, and a sub-band coding (SBC) codec 223. The Bluetooth radio 206 may comprise a PCM block 214, an I2S block 219, and a UART 220.

The antennas 201*a* and 210*b* may comprise suitable logic circuitry, and/or code that may enable wireless signals transmission and/or reception. The output device driver 202 may comprise suitable logic, circuitry, and/or code that may enable controlling the operation of the output devices 203. In this regard, the output device driver 202 may receive at least one signal from the DSP 215 and/or may utilize at least one signal generated by the analog processing unit 208. The output devices 203 may comprise suitable logic, circuitry, and/or code that may enable playing, storing, and/or communicating analog audio, voice, polyringer, and/or mixed signals from the analog processing unit 208. The output devices 203 may comprise speakers, speakerphones, stereo speakers, headphones, and/or storage devices such as audio tapes, for example. The input devices 204 may comprise suitable logic, circuitry, and/or code that may enable receiving of analog audio and/or voice data and communicating it to the analog processing unit 208 for processing. The input devices 204 may comprise one or more microphones and/or auxiliary microphones, for example. The multimedia devices 224 may comprise suitable logic, circuitry, and/or code that may be enable communication of multimedia data with the core processor 218 in the baseband processor 205. The multimedia devices 224 may comprise cameras, video recorders, video displays, and/or storage devices such as memory sticks, for example.

The Bluetooth radio 206 may comprise suitable logic, circuitry, and/or code that may enable transmission, reception, and/or processing of information by utilizing the Bluetooth radio protocol. In this regard, the Bluetooth radio 206 may support amplification, filtering, modulation, and/or demodulation operations, for example. The Bluetooth radio 206 may enable data to be transferred from and/or to the baseband processor 205 via the PCM block 214, the I2S block 219, and/or the UART 220, for example. In this regard, the Bluetooth radio 206 may communicate with the DSP 215 via the PCM block 214 and with the core processor 218 via the I2S block 221 and the UART/SPI block 222.

The modem 207 in the baseband processor 205 may comprise suitable logic, circuitry, and/or code that may enable modulation and/or demodulation of signals communicated via the antenna 201*a*. The modem 207 may communicate with the DSP 205. The shared memory 217 may comprise suitable logic, circuitry, and/or code that may enable storage of data. The shared memory 217 may be utilized for communicating data between the DSP 215 and the core processor 218. The master clock 216 may comprise suitable logic, circuitry, and/or code that may enable generating at least one clock signal for various components of the baseband processor 205. For example, the master clock 216 may generate at least one clock signal that may be utilized by the analog processing unit 208, the audio codec 209, the DSP 215, and/or the core processor 218, for example.

The core processor 218 may comprise suitable logic, circuitry, and/or code that may enable processing of audio and/or voice data communicated with the DSP 215 via the shared memory 217. The core processor 218 may comprise suitable logic, circuitry, and/or code that may enable processing of multimedia information communicated with the multimedia devices 224. In this regard, the core processor 218 may also control at least a portion of the operations of the multimedia devices 224, such as generation of signals for controlling data transfer, for example. The core processor 218 may also enable communicating with the Bluetooth radio via the I2S block 221 and/or the UART/SPI block 222. The core processor 218 may also be utilized to control at least a portion of the operations of the baseband processor 205, for example. The SBC codec 223 in the core processor may comprise suitable logic, circuitry, and/or code that may enable coding and/or decoding audio signals, such as music or mixed audio data, for example, for communication with the Bluetooth radio 206.

The DSP 215 may comprise suitable logic, circuitry, and/or code that may enable processing of a plurality of audio signals, such as digital general audio data, digital voice data, and/or digital polyringer data, for example. In this regard, the DSP 215 may enable generation of digital polyringer data. The DSP 215 may also enable generation of at least one signal that may be utilized for controlling the operations of, for example, the output device driver 202 and/or the audio codec 209. The DSP 215 may be utilized to communicate processed audio and/or voice data to the core processor 218 and/or to the Bluetooth radio 206. The DSP 215 may also enable receiving audio and/or voice data from the Bluetooth radio 206 and/or from the multimedia devices 224 via the core processor 218 and the shared memory 217.

The speech codec 211 may comprise suitable logic, circuitry, and/or code that may enable coding and/or decoding of voice data. The audio player 212 may comprise suitable logic, circuitry, and/or code that may enable coding and/or decoding of audio or musical data. For example, the audio player 212 may be utilized to process digital audio encoding formats such as MP3, WAV, AAC, uLAW/AU, AIFF, AMR, and MIDI, for example. The audio codec hardware control 210 may comprise suitable logic, circuitry, and/or code that may enable communication with the audio codec 209. In this regard, the DSP 215 may communicate more than one audio signal to the audio codec 209 for processing. Moreover, the DSP 215 may also communicate more than one signal for controlling the operations of the audio codec 209.

The audio codec 209 may comprise suitable logic, circuitry, and/or code that may enable processing audio signals received from the DSP 215 and/or from input devices 204 via the analog processing unit 208. The audio codec 209 may enable utilizing a plurality of digital audio inputs, such as 16 or 18-bit inputs, for example. The audio codec 209 may also enable utilizing a plurality of data sampling rate inputs. For example, the audio codec 209 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The audio codec 209 may also support mixing of a plurality of audio sources. For example, the audio codec 209 may support at least three audio sources, such as general audio, polyphonic ringer, and voice. In this regard, the general audio and polyphonic ringer sources may support the plurality of sampling rates that the audio codec 209 is enabled to accept, while the voice source may support a portion of the plurality of sampling rates, such as 8 kHz and 16 kHz, for example.

The audio codec 209 may also support independent and dynamic digital volume or gain control for each of the audio sources that may be supported. The audio codec 209 may also support a mute operation that may be applied to each of the audio sources independently. The audio codec 209 may also support adjustable and programmable soft ramp-ups and ramp-down for volume control to reduce the effects of clicks and/or other noises, for example. The audio codec 209 may also enable downloading and/or programming a multi-band equalizer to be utilized in at least a portion of the audio sources. For example, a 5-band equalizer may be utilized for audio signals received from general audio and/or polyphonic ringer sources.

The audio codec 209 may also utilize a programmable infinite impulse response (IIR) filter and/or a programmable finite impulse response (FIR) filter for at least a portion of the audio sources to compensate for passband amplitude and phase fluctuation for different output devices. In this regard, filters coefficients may be configured or programmed dynamically based on current operations. Moreover, filter coefficients may all be switched in one-shot or may be switched sequentially, for example. The audio codec 209 may also utilize a modulator, such as a Delta-Sigma ($\Delta\Sigma$) modulator, for example, to code digital output signals for analog processing.

In operation, the audio codec 209 in the wireless system 200 may communicate with the DSP 215 in order to transfer audio data and control signals. Control registers for the audio codec 209 may reside within the DSP 215. For voice data, the audio samples need not be buffered between the DSP 215 and the audio codec 209. For general audio data and for polyphonic ringer path, audio samples from the DSP 215 may be written into a FIFO and then the audio codec 209 may fetch the data samples. The DSP 215 and the core processor 218 may exchange audio signals and control information via the shared memory 217. The core processor 218 may write PCM audio directly into the shared memory 217. The core processor 218 may also communicate coded audio data to the DSP 215 for computationally intensive processing. In this regard, the DSP 215 may decode the data and may writes the PCM audio signals back into the shared memory 217 for the core processor 218 to access. Moreover, the DSP 215 may decode the data and may communicate the decoded data to the audio codec 209. The core processor 218 may communicate with the audio codec 209 via the DSP 215. Notwithstanding the wireless system 200 disclosed in FIG. 2A, aspects of the invention need not be so limited.

Figure 2B:
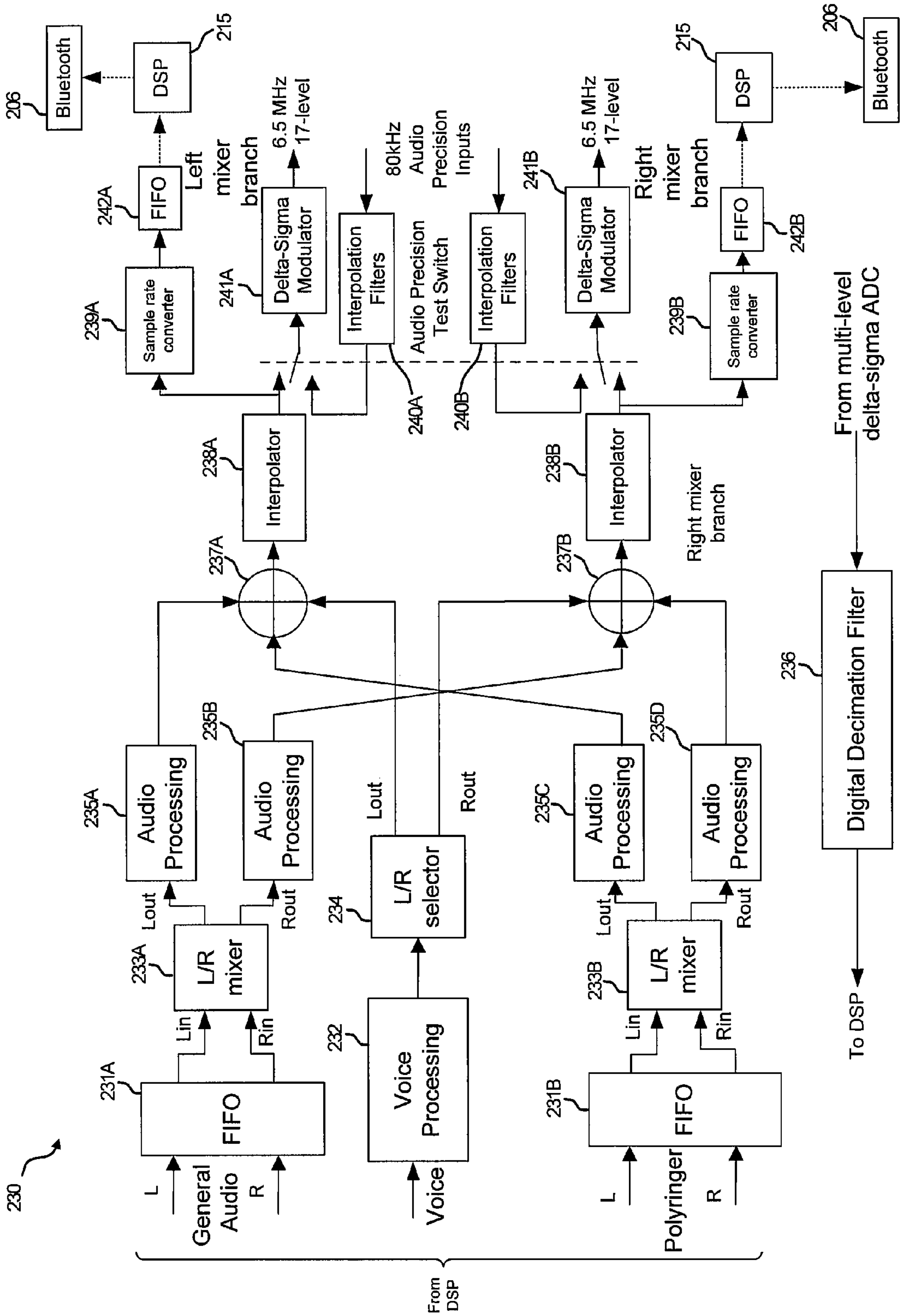
FIG. 2B is a block diagram illustrating an exemplary audio codec in a multimedia baseband processor, which may be utilized in connection with an embodiment of the invention.

FIG. 2B is a block diagram illustrating an exemplary audio codec in a multimedia baseband processor, which may be utilized in connection with an embodiment of the invention. Referring to FIG. 2B, there is shown an audio codec 230 that may correspond to the audio codec 209 disclosed in FIG. 2A. The audio codec 230 may comprise a first portion for communicating data from a DSP, such as the DSP 215, to output devices and/or to a Bluetooth radio, such the output devices 203 and the Bluetooth radio 206. The audio codec 230 may also comprise a second portion that may be utilized for communicating data from input devices, such as the input devices 204, to the DSP 215, for example.

The first portion of the audio codec 230 may comprise a general audio path from the DSP 215, a voice path from the DSP 215, and a polyphonic ringer or polyringer path from the DSP 215. In this regard, the audio codec 230 may utilize a separate processing path before mixing each audio source or audio source type that may be supported. The general audio path may comprise a FIFO 231A, a left and right channels (L/R) mixer 233A, a left channel audio processing block 235A, and a right channel audio processing block 235B. The voice path may comprise a voice processing block 232 and a left and right channels (L/R) selector 234. The polyringer path may comprise a FIFO 231B, an L/R mixer 233B, a left channel audio processing block 235C, and a right channel audio processing block 235D.

Regarding the general audio path and the polyringer path, the FIFOs 231A and 231B may comprise suitable logic, circuitry, and/or code that may enable storage of left and right channels audio signals from general audio source and polyringer source respectively. In this regard, each of the audio signals may be sampled at one of a plurality of sample rates that may be supported by the audio codec 230 for general audio data and/or polyringer data. The L/R mixer 233A may comprise suitable logic, circuitry, and/or code that may enable mixing the input right and left channels from the FIFO 231A to generate mixed left and right channels outputs to the audio processing blocks 235A and 235B respectively. The L/R mixer 233B may comprise suitable logic, circuitry, and/or code that may enable mixing the input right and left channels from the FIFO 231B to generate mixed left and right channels outputs to the audio processing blocks 235C and 235D respectively. The audio processing blocks 235A, 235B, 235C, and 235D may comprise suitable logic, circuitry, and/or code that may enable processing audio signals. In this regard, the audio processing blocks 235A, 235B, 235C, and/or 235D may support equalization operations, compensation operations, rate adaptation operations, and/or volume control operations, for example. The outputs of the audio processing blocks 235A and 235C may be communicated to the left channel branch mixer 237A. The outputs of the audio processing blocks 235B and 235D may be communicated to the right channel branch mixer 237B. The rate adaptation operations enable the outputs of the audio processing blocks 235A, 235B, 235C, and 235D to be at the same sampling rate when communicated to the mixers 237A and 237B.

Regarding the audio voice path, the voice processing block 232 may comprise suitable logic, circuitry, and/or code that may enable processing voice received from the DSP 215 in one of a plurality of voice sampling rates supported by the audio codec 230. In this regard, the voice processing block 232 may support compensation operations, rate adaptation operations, and/or volume control operations, for example. The L/R selector 234 may comprise suitable logic, circuitry, and/or code that may enable separating the voice signal contents into a right channel signal that may be communicated to the mixer 237B and a left channel signal that may be communicated to the mixer 237A. The rate adaptation operation may enable the outputs of the voice processing blocks 232 to be at the same sampling rate as the outputs of the audio processing blocks 235A, 235B, 235C, and/or 235D when communicated to the mixers 237A and 237B. For example, the input signals to the mixers 237A and 237B may be adjusted via up and/or down sampling in the audio processing blocks 235A, 235B, 235C, and 235D and the voice processing block 232 to have the same sampling rates.

The mixer 237A may comprise suitable logic, circuitry, and/or code that may enable mixing the outputs of the audio processing blocks 235A and 235C and the left channel output of the L/R selector 234. The mixer 237B may comprise suitable logic, circuitry, and/or code that may enable mixing the outputs of the audio processing blocks 235B and 235D and the right channel output of the L/R selector 234. The output of the mixer 237A may be associated with the left channel branch of the audio codec 230 while the output of the mixer 237B may be associated with the right channel branch of the audio codec 230. Also associated with the left channel branch may be an interpolator 238A, a sample rate converter 239A, a FIFO 242A, a ΔΣ modulator 241A, and an interpolation filter 240A. Also associated with the right channel branch may be an interpolator 238B, a sample rate converter 239B, a FIFO 242B, a ΔΣ modulator 241B, and an interpolation filter 240B. The interpolation filters 240A and 240B may be optional and may be utilized for testing, for example, to interface to audio testing equipment using the Audio Precision interface or any other interfaces adopted in the industry.

The interpolators 238A and 238B may comprise suitable logic, circuitry, and/or code that may enable up-sampling of the outputs of the mixers 237A and 237B. The sample rate converters 239A and 239B may comprise suitable logic, circuitry, and/or code that may enable adjusting the output signals from the interpolators 238A and 239B to a sampling rate that may be utilized by the DSP 215 and/or the core processor 218 for communication to the Bluetooth radio 206. In this regard, the sample rate converters 239A and 239B may adjust the sampling rates to 44.1 kHz or 48 kHz, for example, for subsequent communication to the Bluetooth radio 206. The sample rate converters 239A and 239B may be implemented as interpolators, such as linear interpolators or more sophisticated decimation filters, for example. The audio and/or voice signal outputs from the sample rate converters 239A and 239B may be communicated to FIFOs 242A and 242B before being communicated to the DSP 215 and/or core processor 218 and later to the Bluetooth radio 206. The ΔΣ modulators 241A and 241B may comprise suitable logic, circuitry, and/or code that may enable modulation of the outputs of the interpolators 238A and 238B to achieve a specified level output signal. For example, the ΔΣ modulators 241A and 241B may receive the 23-bit 6.5 MHz signals from the interpolators 238A and 238B and may reduce the signals levels to generate 6.5 MHz 17-level signals, for example.

The second portion of the audio codec 230 may comprise a digital decimation filter 236. The digital decimation filter 236 may comprise suitable logic, circuitry, and/or code that may enable processing a digital audio signal received from the analog processing unit 208, for example, before communicating the processed audio signal to the DSP 215. The digital decimation filter 236 may comprise FIR decimation filters, CIC decimation filters that may be followed by a plurality of IIR compensation and decimation filters, for example.

Figure 2C:
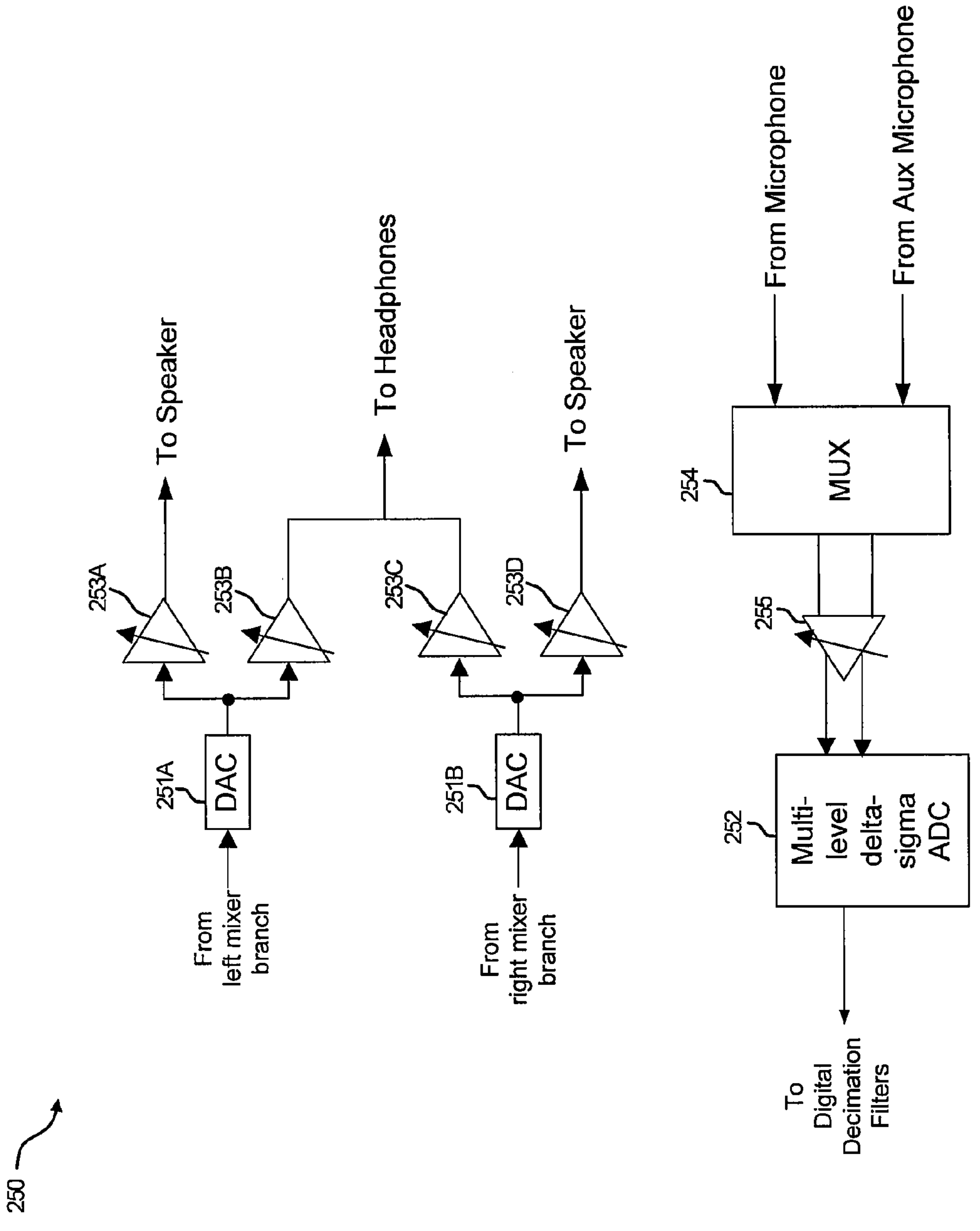
FIG. 2C is a block diagram illustrating an exemplary analog processing unit in a multimedia baseband processor, which may be utilized in connection with an embodiment of the invention.

FIG. 2C is a block diagram illustrating an exemplary analog processing unit in a multimedia baseband processor, which may be utilized in connection with an embodiment of the invention. Referring to FIG. 2C, there is shown an analog processing unit 250 that may correspond to the analog processing unit 208 in FIG. 2A. The analog processing unit 250 may comprise a first portion for digital-to-analog conversion and a second portion for analog-to-digital conversion. The first portion may comprise a first digital-to-analog converter (DAC) 251A and a second DAC 251B that may each comprise suitable logic, circuitry, and/or code that may enable converting digital signals from the left and the right mixer branches in the audio codec 230, respectively, to analog signals. The output of the DAC 251A may be communicated to the variable gain amplifiers 253A and 253B. The output of the DAC 251B may be communicated to the variable gain amplifiers 253C and 253D. The variable gain amplifiers 253A, 253B, 253C, and 253D may each comprise suitable logic, circuitry, and/or code that may enable dynamic variation of the gain applied to their corresponding input signals. The output of the amplifier 253A may be communicated to at least one left speaker while the output of the amplifier 253D may be communicated to at least one right speaker, for example. The outputs of amplifiers 253B and 253D may be combined and communicated to a set of headphones, for example.

The second portion of the analog processing unit 250 may comprise a multiplexer (MUX) 254, a variable gain amplifier 255, and a multi-level Delta-Sigma (ΔΣ) analog-to-digital converter (ADC) 252. The MUX 254 may comprise suitable logic, circuitry, and/or code that may enable selection of an input analog signal from a microphone or from an auxiliary microphone, for example. The variable gain amplifier 255 may comprise suitable logic, circuitry, and/or code that may enable dynamic variation of the gain applied to the analog output of the MUX 254. The multi-level ΔΣ ADC 252 may comprise suitable logic, circuitry, and/or code that may enable conversion of the amplified output of the variable gain amplifier 255 to a digital signal that may be communicated to the digital decimation filter 236 in the audio codec 230 disclosed in FIG. 2B. In some instances, the multi-level ΔΣ ADC 252 may be implemented as a 3 level ΔΣ ADC, for example. Notwithstanding the exemplary analog processing unit 250 disclosed in FIG. 2C, aspects of the invention need not be so limited.

Figure 2D:
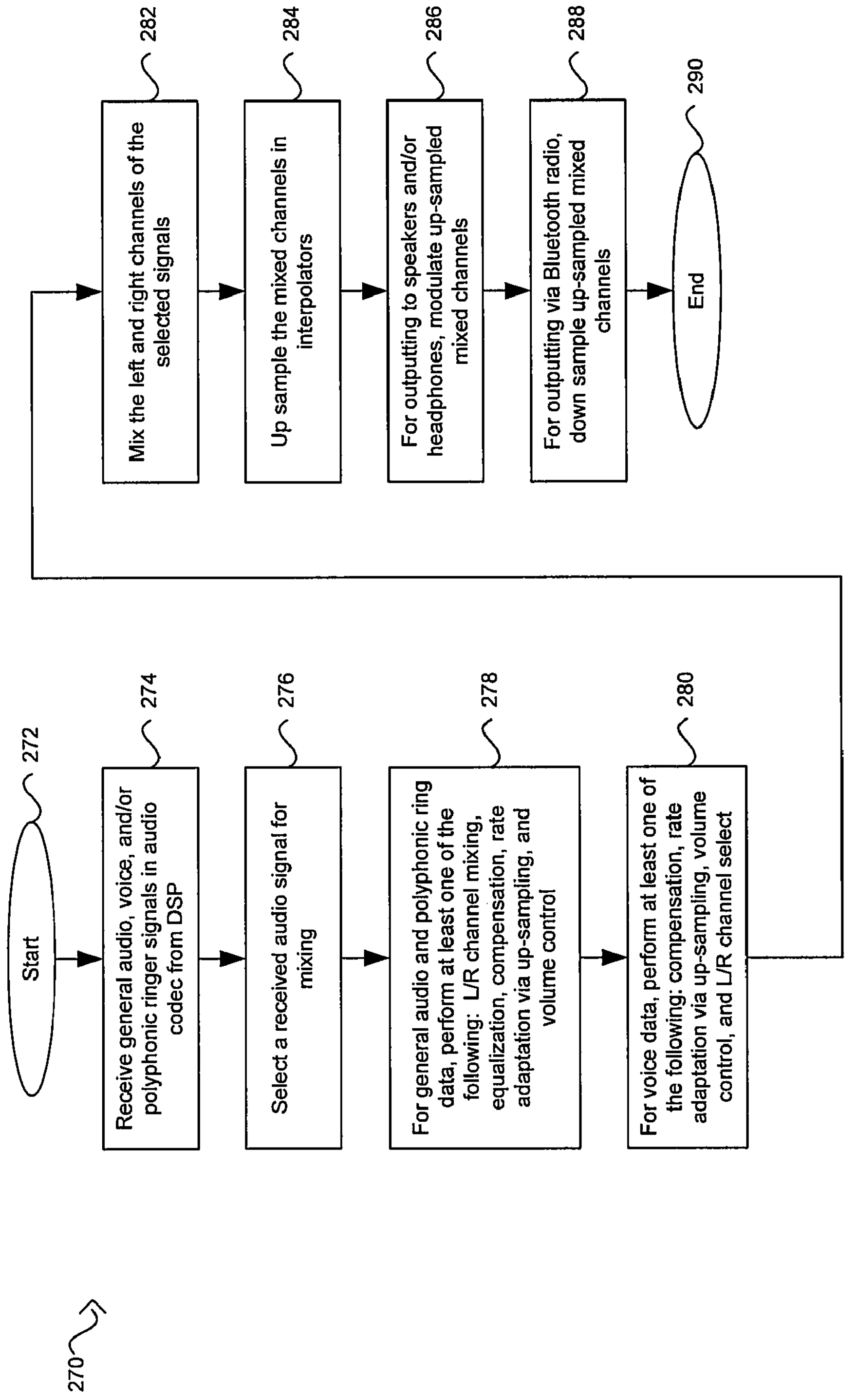
FIG. 2D is a flow diagram illustrating exemplary steps for data mixing in the audio codec, which may be utilized in connection with an embodiment of the invention.

FIG. 2D is a flow diagram illustrating exemplary steps for data mixing in the audio codec, which may be utilized in connection with an embodiment of the invention. Referring to FIG. 2D, there is shown a flow 270. After start step 272, in step 274, the audio codec 230 disclosed in FIG. 2B may receive two or more audio signals from a general audio source, a polyphonic ringer audio source, and/or a voice audio source via the DSP 215, for example. In step 276, the audio codec 230 may be utilized to select two or more of the received audios signals for mixing. In this regard, portions of the audio codec 230 may be programmed, adjusted, and/or controlled to enable selected audio signals to be mixed. For example, a mute operation may be utilized to determine which audio signals may be mixed in the audio codec 230.

In step 278, when the audio signals to be mixed comprises general audio and/or polyphonic ringer audio, the signals may be processed in the audio processing blocks 235A, 235B, 235C, and 235D where equalization operations, compensation operations, rate adaptation operations, and/or volume control operations may be performed on the signals. Regarding the rate adaptation operations, the data sampling rate of the input general audio or polyphonic ringer audio signals may be adapted to a specified sampling rate for mixing. In step 280, when one of the audio signals to be mixed comprises voice, the voice signal may be processed in the voice processing block 232 where compensation operations, rate adaptation operations, and/or volume control operations may be performed on the voice signals. Regarding the rate adaptation operations, the data sampling rate of the input voice signals may be adapted to specified sampling rate for mixing.

In step 282, the left channel general audio and polyringer signals generated by the audio processing blocks 235A and 235C and the left channel voice signals generated by the L/R selector 234 may be mixed in the mixer 237A. Similarly, the right channel general audio and polyringer signals generated by the audio processing blocks 235B and 235D and the right channel voice signals generated by the L/R selector 234 may be mixed in the mixer 237B. In step 284, the outputs of the mixers 237A and 237B corresponding to the mixed left and right channel signals may be up-sampled by the interpolators 238A and 238B respectively. By generating signals with a higher sampling rate after mixing, the implementation of the sample rate converters 239A and 239B may also be simplified.

In step 286, when communicating the up-sampled mixed left and right channels signals to output devices, such as the output devices 203 disclosed in FIG. 2A, the audio codec 230 may utilize the ΔΣ modulators 241A and 241B to reduce the digital audio signals to signals with the much fewer but appropriate levels. In this regard, the output signals may be communicated to the DACs 251A and 251B and to the variable gain amplifiers 253A, 253B, 253C, and 253D disclosed in FIG. 2C for analog conversion and for signal gain respectively. In step 288, when communicating the up-sampled mixed left and right channel signals to the Bluetooth radio 206, the audio codec 230 may down-sample the audio signals by utilizing the sample rate converters 239A and 239B and then communicating the down-sampled signals to the FIFOs 242A and 242B. The DSP 215 may fetch the down-sampled audio signals from the FIFOs 242A and 242B and may then communicate the digital audio signals to the Bluetooth radio 206. Notwithstanding the exemplary steps for mixing audio sources disclosed in FIG. 2D, aspects of the invention need not be so limited.

Figure 3:
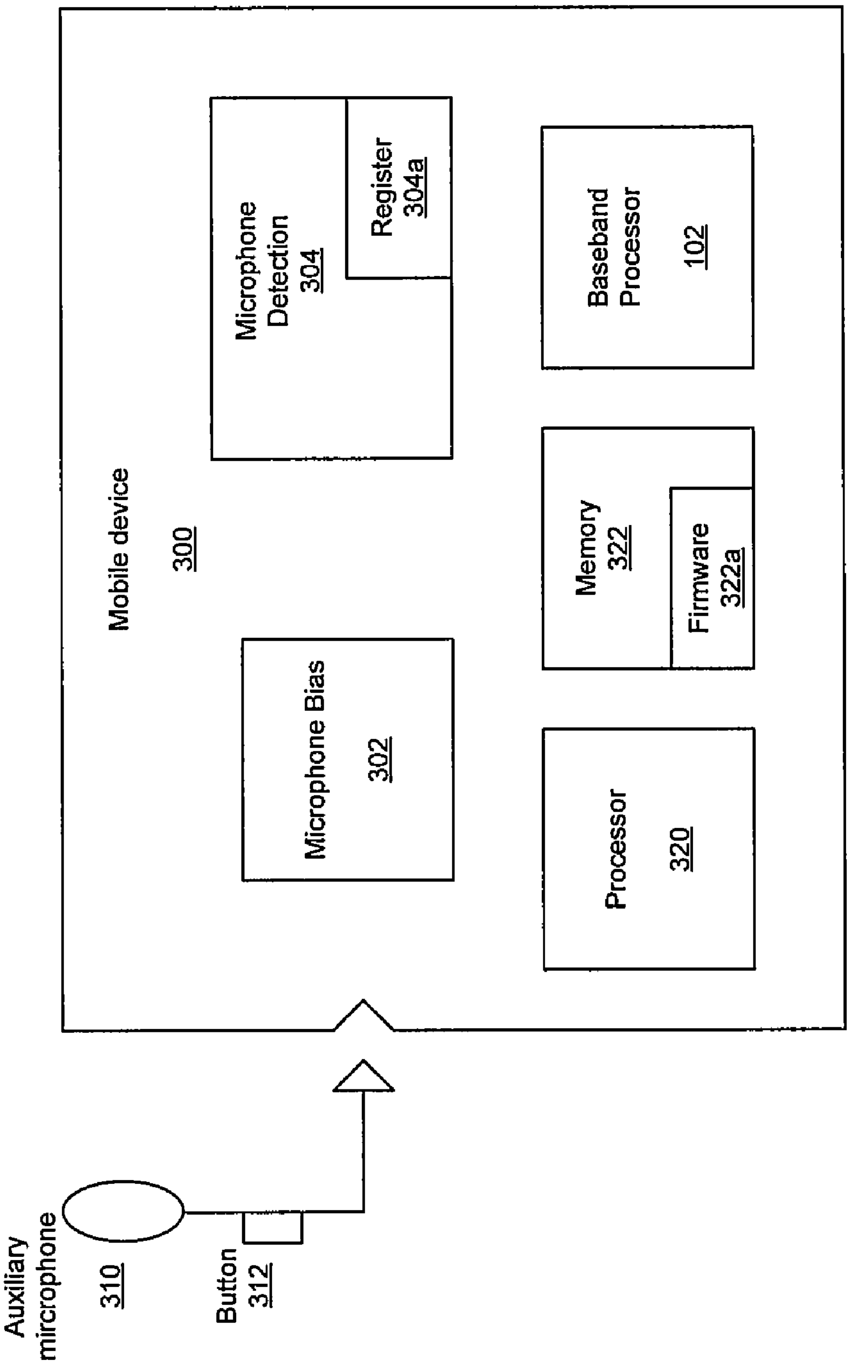
FIG. 3 is a block diagram illustrating exemplary circuitry for supporting microphones, in accordance with an embodiment of the invention.

FIG. 3 is a block diagram illustrating exemplary circuitry for supporting microphones, in accordance with an embodiment of the invention. Referring to FIG. 3, there is shown a mobile device 300 that comprises a microphone bias block 302, an auxiliary microphone detection block 304, a processor 320, a memory block 322, and the baseband processor 102. There is also shown an auxiliary microphone 310 and an auxiliary microphone button 312, which may operate when the auxiliary microphone 310 is plugged into the mobile device 300. The mobile device 300 may, for example, use the auxiliary microphone 310 for hands-free operation in instances when the mobile device 300 may be, for example, located in a user's pocket or on a car seat. The microphone bias block 302 may comprise suitable logic, circuitry, and/or code that may enable biasing of the auxiliary microphone 310 for proper operation.

The auxiliary microphone detection block 304 may comprise suitable logic, circuitry, and/or code that may enable detection of the auxiliary microphone 310 when it is plugged in to the mobile device 300. The auxiliary microphone detection block 304 may also provide control signals to, for example, the microphone bias block 302 for generation of bias voltages for microphones. The auxiliary microphone detection block 304 may comprise a register block 304*a* that may be used for storing data from, for example, the processor 320. The data in the register block 304*a* may comprise data for configuring various functionality in the auxiliary microphone detection block 304.

The auxiliary microphone 310 may be plugged in to the mobile device 300, where the auxiliary microphone 310 may be used rather than a built-in microphone, such as, for example, the built-in microphone 113*a*. The auxiliary microphone button 312 may be, for example, pushed by the user to answer an incoming call and/or terminate an existing call. The microphone bias block 302 and/or the auxiliary microphone detection block 304 may be part of, for example, the audio input/output interface block 172. The memory block 322 may comprise firmware 322*a* that may be executed by, for example, the processor 320.

In operation, a user (not shown) may plug in the auxiliary microphone 310 into the mobile device 300 to be able use the mobile device 300 in a hands-free mode. The mobile device 300 may comprise, for example, mobile phone functionality. Accordingly, the auxiliary microphone detection block 304 may operate to detect insertion of the auxiliary microphone 310, presence of the auxiliary microphone 310 and detection of the auxiliary microphone button 312 being pressed, and/or the removal of the auxiliary microphone 310.

Upon detection of insertion of the auxiliary microphone 310, the auxiliary microphone detection block 304 may provide control signals to the microphone bias block 302 for appropriately biasing the auxiliary microphone 310. Some embodiments of the invention may allow biasing of the auxiliary microphone 310 when the auxiliary microphone 310 is actually needed. For example, if the mobile device 300 comprises mobile phone functionality, the auxiliary microphone 310 may be biased when its presence is detected and when the user is notified of an incoming call and/or when the user initiates an outgoing call. Accordingly, even though the auxiliary microphone 310 may be plugged in, it may not be powered up until it is needed. Other embodiments of the invention may allow biasing of the auxiliary microphone 310 while it is plugged in to the mobile device 300 even when the user has no need for use of the auxiliary microphone 310.

Figure 4:
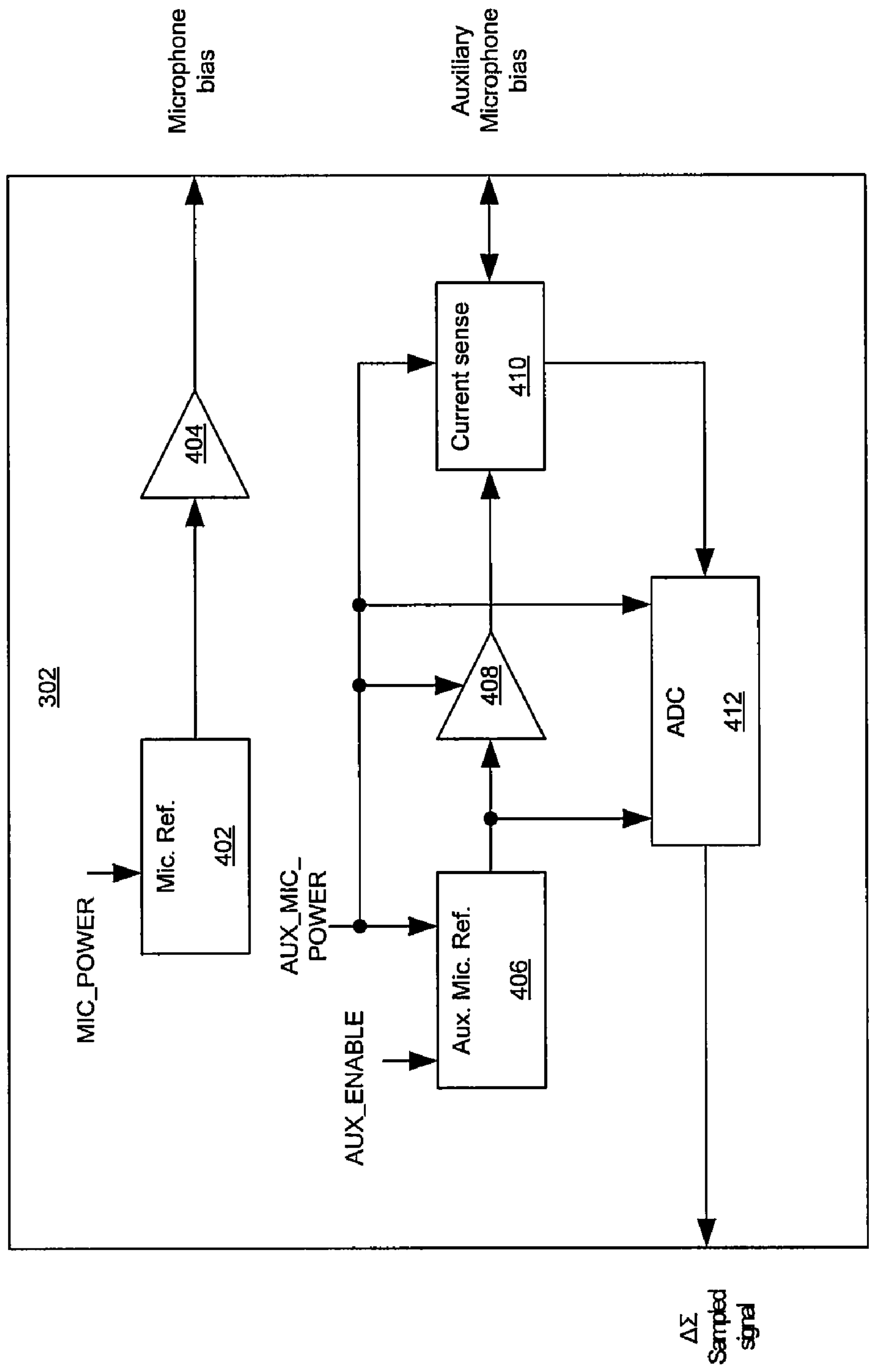
FIG. 4 is a block diagram illustrating an exemplary microphone biasing circuitry, in accordance with an embodiment of the invention.

FIG. 4 is a block diagram illustrating an exemplary microphone biasing circuitry, in accordance with an embodiment of the invention. Referring to FIG. 4, there is shown the microphone bias block 302, which may comprise a microphone bias reference circuitry 402 and 406, amplifiers 404 and 408, current sense block 410, and an analog-to-digital (ADC) block 412. The microphone bias reference circuitry 402 and 406 may each comprise suitable logic, circuitry, and/or code that may enable generation of a reference voltage that may be communicated to an amplifier, for example, the amplifier 404 and 408, respectively.

The amplifiers 404 and 408 may comprise suitable logic and/or circuitry that may enable amplifying an input voltage to a biasing level voltage for a microphone. The current sense block 410 may comprise suitable logic, circuitry, and/or code that may enable communicating the biasing voltage from the amplifier 408 to the auxiliary microphone 310. The current sense block 410 may also derive signals corresponding to current consumption from biasing the auxiliary microphone for communicating to the ADC block 412. Current consumptions may be different for the states where the auxiliary microphone 310 is plugged in, the auxiliary microphone 310 is not plugged in, and where the auxiliary microphone button 312 is pushed, or otherwise activated. The ADC block 412 may comprise suitable logic, circuitry, and/or code that may enable conversion of analog signal to, for example, a 1 bit digital signal at a 32 KHz sampling rate. Output of the ADC block 412 may be proportional to the current consumption for the state where the auxiliary microphone 310 is plugged in, the auxiliary microphone 310 is not plugged in, or where the auxiliary microphone button 312 is pushed, or otherwise activated.

In operation, the auxiliary microphone detection block 304 may not be turned on all the time. Accordingly, the auxiliary microphone detection block 304 may deassert a control signal, for example, the AUX_MIC_POWER signal, to the microphone bias reference circuitry 406, the amplifier 408, the current sense block 410 and the ADC block 412. The deasserted AUX_MIC_POWER signal may indicate to the various circuitry to which the control signal may have been communicated to power down. Accordingly, the power usage may be reduced by the microphone bias reference circuitry 406, the amplifier 408, the current sense block 410 and the ADC block 412.

The microphone bias reference circuitry 406 may be communicated an enable signal AUX_ENABLE by, for example, the processor block 320. When the AUX_ENABLE signal is asserted, the microphone bias reference circuitry 406 may output a bias voltage of, for example, 2.1 volts, which may be used for operational mode. When the AUX_ENABLE signal is deasserted, the microphone bias reference circuitry 406 may output a bias voltage of, for example, 0.45 volts, which may be used for sleep mode. The AUX_ENABLE signal may be generated based on, for example, whether a call is on. Generation of the AUX_ENABLE signal may also be based on, for example, data from the processor 320. For example, the processor 320 may communicate data that may indicate that the AUX_ENABLE signal may be asserted or deasserted.

The auxiliary microphone detection block 304 may also deassert a control signal, for example, the AUX_MIC_POWER signal, to the microphone bias reference circuitry 406, the amplifier 408, the current sense block 410, and the ADC block 412 if, for example, the auxiliary microphone 310 is not needed. If the auxiliary microphone 310 is needed, for example, for a phone conversation, the auxiliary microphone detection block 304 may assert the control signal AUX_MIC_POWER signal to the microphone bias reference circuitry 406, the amplifier 408, the current sense block 410, and the ADC block 412. Accordingly, the microphone bias reference circuitry 406 and the amplifier 408 may be utilized to generate bias voltage, or the microphone bias signal, for the auxiliary microphone 310. The current sense block 410 and the ADC block 412 may also be used as an interface for detecting when a user pushes or activates the auxiliary microphone button 312.

The user may push the auxiliary microphone button 312, for example, to answer an incoming phone call and/or to terminate an existing phone call. The push of the auxiliary microphone button 312 may, for example, change a current draw level from the microphone bias signal via a short-circuit in the auxiliary microphone 310, for example. The current sense block 410 may communicate a voltage corresponding to the current consumption on the microphone bias signal to the ADC block 412. The ADC block 412 may sample the input voltage to generate digital samples at a pre-determined rate of, for example, 32 KHz. The output $\Delta\Sigma$ sampled signal may comprise a 1-bit output, where a logical one may indicate that the input analog signal is above a threshold voltage, and a logical zero may indicate that the input analog signal is below a threshold voltage. The $\Delta\Sigma$ sampled signal may be communicated to, for example, the auxiliary microphone detection block 304. The threshold voltage may be design and/or implementation dependent. Some embodiments of the invention may utilize, for example, the output of the auxiliary microphone bias reference circuitry 406 output as the threshold level.

Figure 5:
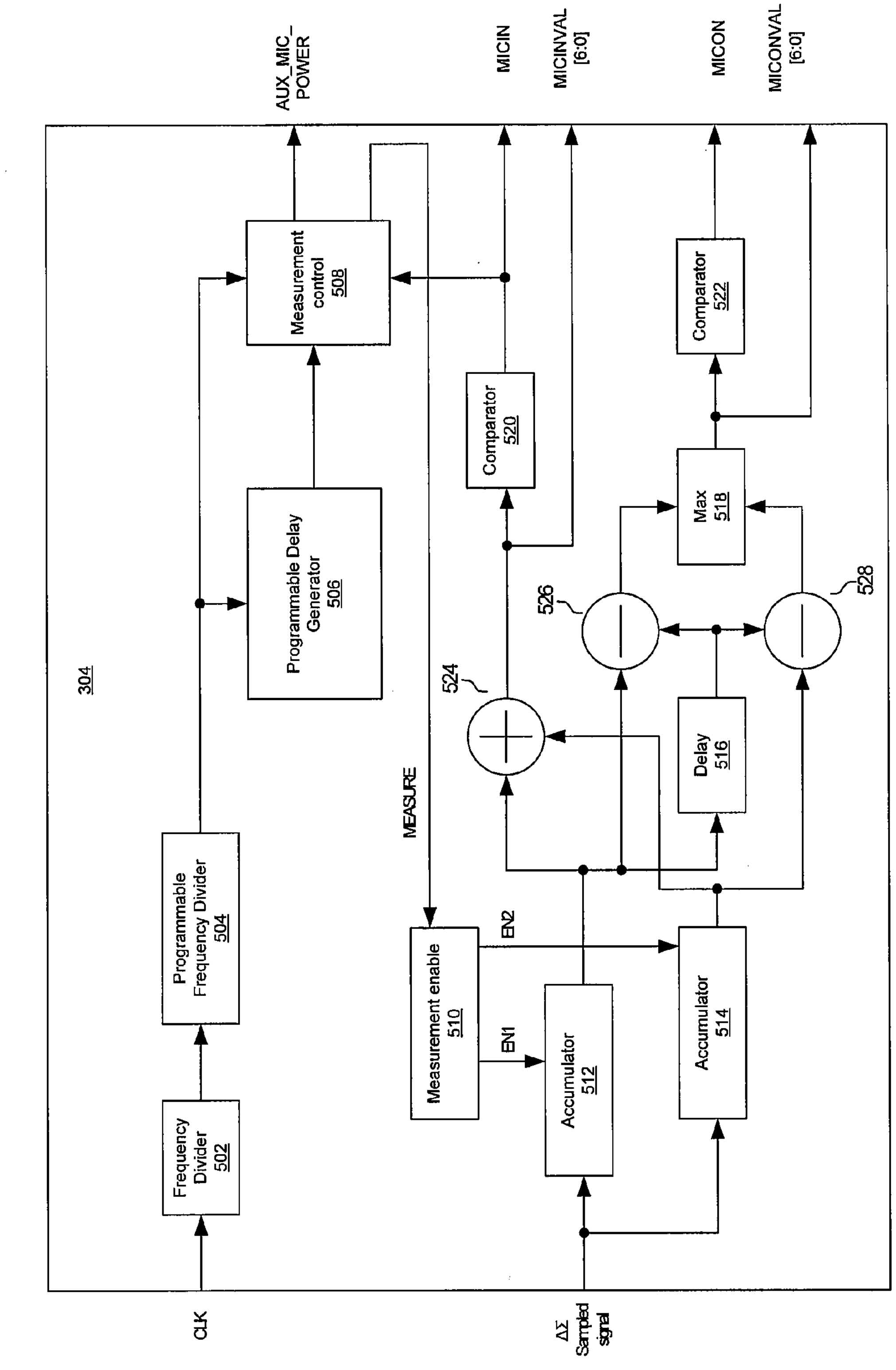
FIG. 5 is a block diagram illustrating an exemplary auxiliary microphone detection circuitry, in accordance with an embodiment of the invention.

FIG. 5 is a block diagram illustrating an exemplary auxiliary microphone detection circuitry, in accordance with an embodiment of the invention. Referring to FIG. 5, there is shown the auxiliary microphone detection block 304, which may comprise a frequency divider 502, a programmable frequency divider 504, a programmable delay block 506, a measurement control block 508, a measurement enable block 510, accumulator blocks 512 and 514, delay block 516, a maximum detection block 518, comparator blocks 520 and 522, and combiner blocks 524, 526, and 528.

The frequency divider 502 may comprise suitable logic, circuitry and/or code that may enable reducing a frequency of a digital signal. For example, the frequency divider 502 may divide a 32 KHz digital clock to a 1 KHz digital clock. The programmable frequency divider 504 may comprise suitable logic, circuitry and/or code that may enable dividing an input digital signal by an integer value indicated by, for example, the processor 320 and/or the baseband processor 102. An embodiment of the invention may enable the programmable frequency divider 504 to divide by, for example, 64, 128, 256, or 512.

The programmable delay block 506 may comprise suitable logic, circuitry and/or code that may enable delaying, for example, relative to the AUX_MIC_Power signal, of a measurement enable signal from block 508 by a programmable amount of time. For example, the processor 320 may indicate to the programmable delay block 506 the number of milliseconds of delay to provide to an input signal. The delay may be, for example, 1, 2, 4, 8, 16, 32, 64, or 128 milliseconds. The measurement control block 508 may comprise suitable logic, circuitry and/or code that may enable generation of a plurality of signals for controlling, for example, the microphone bias block 302. For example, the measurement control block 508 may generate a signal to enable/disable the bias voltage for the auxiliary microphone 310. This signal may be referred to as, for example, the AUX_MIC_POWER signal. The measurement control block 508 may also generate an output enable signal that may be communicated to the measurement enable block 510.

The measurement enable block 510 may comprise suitable logic, circuitry and/or code that may enable generation of control signals for the accumulator blocks 512 and 514. The accumulator blocks 512 and 514 may comprise suitable logic, circuitry and/or code that may enable accumulation of, for example, the ΔΣ signal samples from the ADC block 412. The accumulation may be enabled during the period when the control signals, for example, EN1 and EN2 for the accumulator blocks 512 and 514, respectively, may be asserted. When the control signals EN1 and EN2 are deasserted, the accumulator blocks 512 and 514 may stop accumulation, may output the accumulated values, and then clear the contents of the accumulator for the next measurement. Other embodiments of the invention may have a single input signal that may control the output of the accumulated values. For example, the control signal EN1 may enable or disable accumulation of data, for accumulator 512 over a measurement enable period while accumulator 514 is disabled.

The delay block 516 may comprise suitable logic, circuitry and/or code that may enable delaying of an input signal by a specified amount of time. The maximum detection block 518 may comprise suitable logic, circuitry and/or code that may enable receiving of two digital inputs and outputting of a larger of the two digital inputs. The comparator blocks 520 and 522 may each comprise suitable logic, circuitry and/or code that may enable comparing a first input to a second input. The output may be, for example, logic 1 if the first input is larger than the second input, and logic 0 if the first input is smaller than the second input. Where the first input and the second input may be the same value, the output may be either logic 1 or logic 0 depending on design and/or implementation criteria. The combiner blocks 524, 526, and 528 may comprise suitable logic, circuitry and/or code that may enable combining two digital signals. The combining may comprise, for example, adding or subtracting the two digital signals to generate a digital output that is the sum or difference of the two digital input signals.

In operation, a 32 KHz input clock may be divided by 32 by the frequency divider 502 to generate a 1 KHz clock. The 1 KHz clock may be communicated to the programmable frequency divider 504. The programmable frequency divider 504 may divide by an appropriate value that may be communicated from, for example, the processor 320, to generate a 16 Hz, 8 Hz, 4 Hz, or a 2 Hz clock signal. The output of the programmable frequency divider 504 may be communicated to the programmable delay generator block 506 and the measurement control block 508. The programmable delay generator block 506 may delay the output from the programmable frequency divider 504 by 1 mS, 2 mS, 4 mS, 8 mS, 16 mS, 32 mS, 64 mS, or 128 mS. The appropriate delay may be communicated to the programmable delay generator block 506 by, for example, the processor 320.

The programmable delay generator block 506 may communicate the delayed signal to the measurement control block 508. The measurement control block 508 may, for example, AND the signal from the programmable frequency divider 504 with the signal from the programmable delay generator block 506 to generate the measurement enable signal MEASURE. The measurement enable signal MEASURE may, for example, be asserted a time period T after the output of the programmable frequency divider 504 is asserted. The time period T may be the delay of the programmable delay generator block 506. The measurement enable signal MEASURE may be deasserted at approximately the same time as the output of the programmable frequency divider 504 is deasserted.

The measurement enable block 510 may, based on the ENABLE signal from the measurement control block 508, be enabled to generate the control signals EN1 and EN2, which may be communicated to the accumulator blocks 512 and 514, respectively. When the control signal EN1 is asserted, the accumulator block 512 may accumulate data for the period when EN1 may be asserted, which may be a portion of a probe cycle. The probe cycle may be a period of time when the mobile device 300 may determine whether an auxiliary microphone 310 may be plugged in, and, if so, whether the auxiliary microphone button 312 may have been pushed, or whether the auxiliary microphone 310 may have been unplugged. The period of a probe cycle may be communicated by, for example, the processor 320.

When the control signal EN1 is deasserted, the accumulator block 512 may output the accumulated data and clear the accumulator block 512 to zero for the next probe cycle. The accumulated data from the accumulator block 512 may be communicated to the delay block 516 and the combiner blocks 524 and 526. Similarly, when the control signal EN2 is asserted, the accumulator block 514 may accumulate data for a period EN2 may be asserted. When the control signal EN2 is deasserted, the accumulator block 514 may output the accumulated data and clear the accumulator block 514 to zero for the next probe cycle. The accumulated data from the accumulator block 514 may be communicated to the combiner blocks 524 and 528.

The measurement enable block 510 may also receive an input signal MEASUREMENT_INTERVAL_CONTROL that may influence assertion of the control signals EN1 and EN2. For example, when the signal MEASUREMENT_INTERVAL_CONTROL is asserted, both the control signals EN1 and EN2 may be asserted at appropriate times. However, when the signal MEASUREMENT_INTERVAL_CONTROL is deasserted, the control signal EN1 may be asserted for a probe cycle, but the control signal EN2 may not be asserted for a probe cycle. This is illustrated by the timing diagrams shown with respect to FIGS. 6A and 6B.

The accumulator blocks 512 and 514 may accumulate the single bit ΔΣ samples from the ADC block 412 during the respective accumulation periods indicated by the controls signals EN1 and EN2. The combiner block 524 may combine, for example, add, the accumulated data from the accumulator blocks 512 and 514. The output of the combiner block 524 may be, for example, a 7-bit value MICINVAL. The 7-bit value MICINVAL may be communicated to, for example, the processor 320. The 7-bit value MICINVAL may also be communicated to the comparator block 520. The comparator block 520 may compare the 7-bit value with a threshold value to generate an output bit MICIN. The output bit MICIN may be asserted, which may indicate that the auxiliary microphone 310 may be plugged in, for example, if the 7-bit value MICINVAL is greater than the threshold value. The output bit MICIN may be deasserted if the 7-bit value MICINVAL is less than or equal to the threshold value, which may indicate that the microphone may be unplugged. The threshold value, which may be referred to as MICINTH, may be communicated to the comparator block 520 by, for example, the processor 320.

The output of the accumulator block 512 may be delayed, for example, for 1 probe cycle by the delay block 516. The output of the delay block 516 may be communicated to the combiner blocks 526 and 528. The output of the accumulator block 512 may be communicated to the combiner block 526 and the output of the accumulator block 514 may be communicated to the combiner block 528. Accordingly, the combiner block 526 may, for example, subtract the output of the delay block 516 from the output of the accumulator 512. The combiner block 528 may, for example, subtract the output of the delay block 516 from the output of the accumulator 514.

The output of a previous accumulation by the accumulator block 512 may be subtracted from a present accumulation by the accumulator block 512 by the combiner block 526. A positive output from the combiner block 526 may indicate a difference in current consumption between a present probe cycle and a previous probe cycle. The output of a previous accumulation by the accumulator block 512 may be subtracted from a present accumulation by the accumulator block 514 by the combiner block 528. A positive output from the combiner block 528 may indicate a difference in current consumption between a present probe cycle and a previous probe cycle.

The outputs of the combiner blocks 526 and 528 may be communicated to the maximum detection block 518. The maximum detection block 518 may select a larger of the two outputs from the combiner blocks 526 and 528. The output of the maximum detection block 518 may be a 7-bit value MICONVAL. The 7-bit value MICONVAL may be communicated to, for example, the processor 320. The 7-bit value MICONVAL may also be communicated to the comparator block 522. The comparator block 522 may compare the 7-bit value with a threshold value to generate an output bit MICON. The output bit MICON may be asserted, for example, if the 7-bit value MICONVAL is greater than the threshold value, which may indicate that the auxiliary microphone button 312 may have been pushed, or otherwise activated. The output bit MICON may be deasserted if the MICONVAL is less than or equal to the threshold value, which may indicate that the auxiliary microphone button 312 may not have been pushed, or otherwise activated. The threshold value, which may be referred to as MICONTH, may be communicated to the comparator block 522 by, for example, the processor 320.

Various embodiments of the invention may use different methods of applying threshold values. For example, an embodiment of the invention may comprise a default threshold value in the comparator blocks 520 and 522. The threshold values may then be adjusted by, for example, the processor 320. The processor 320 may communicate adjustment values to the comparator blocks 520 and/or 522. The threshold adjustments may be based on, for example, an algorithm for processing the values for MICINVAL and MICONVAL.

Figure 6A:
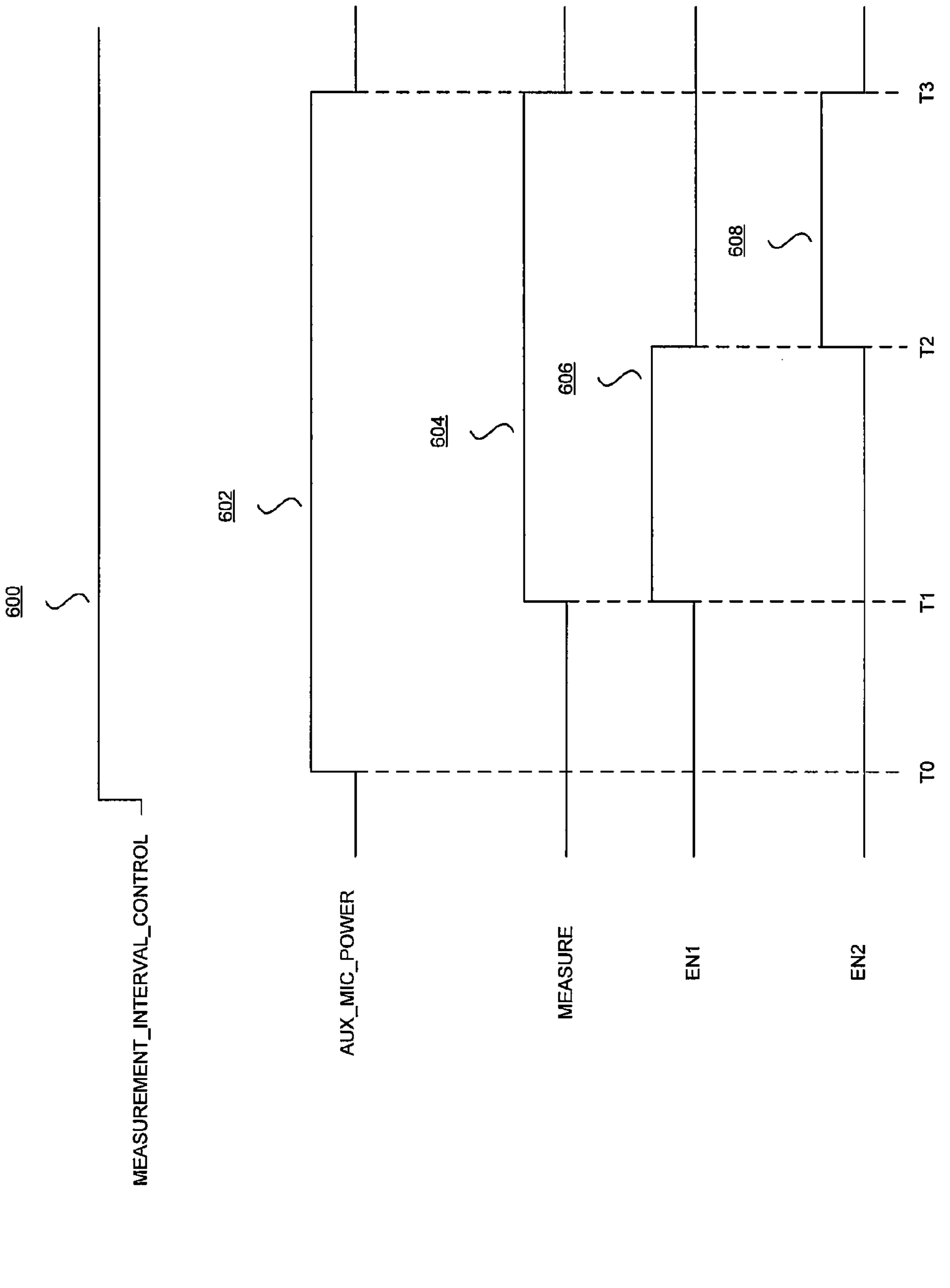
FIG. 6A is a timing diagram illustrating exemplary auxiliary microphone power-up/power-down control and auxiliary microphone status detection, in accordance with an embodiment of the invention.

FIG. 6A is a timing diagram illustrating exemplary auxiliary microphone power-up/power-down control and auxiliary microphone status detection, in accordance with an embodiment of the invention. Referring to FIG. 6A, there is shown timing diagrams of the signals AUX_MIC_POWER 602, MEASURE 604, EN1 606, and EN2 608 for a probe cycle when the signal MEASUREMENT_INTERVAL_CONTROL 600 is asserted. At time instance T0, the signal AUX_MIC_POWER 602 may be asserted. There may be a delay from time instant T0 to time instant T1 and the delay may be a programmable value, which may be programmed by, for example, the processor 320. At time instant T1, the signal MEASURE 604 may be asserted.

The assertion of the signal MEASURE 604 may lead to assertion of the signal EN1 606. Accordingly, the accumulator block 512 may start accumulation of the ΔΣ data from the ADC block 412. At time instant T2, the signal EN1 606 may be deasserted and the signal EN2 608 may be asserted. Accordingly, the accumulator block 512 may output the accumulated data. The accumulator block 514 may start accumulation of the ΔΣ data from the ADC block 412. At time instant T3, the signals AUX_MIC_POWER 602, MEASURE 604, and EN2 608 may be deasserted. Accordingly, the accumulator block 514 may output the accumulated data.

Figure 6B:
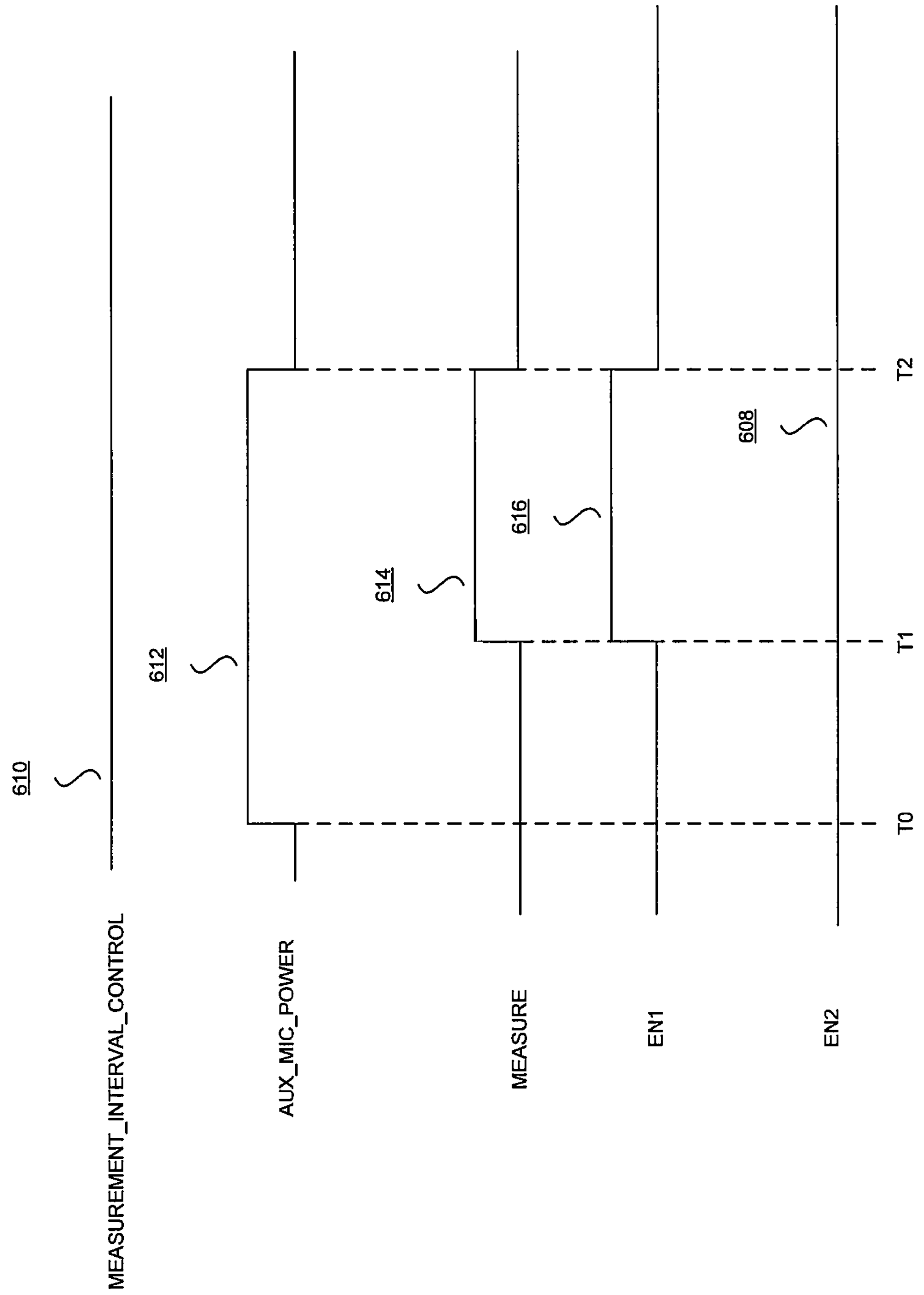
FIG. 6B is a timing diagram illustrating exemplary auxiliary microphone power-up/power-down control and auxiliary microphone status detection, in accordance with an embodiment of the invention.

FIG. 6B is a timing diagram illustrating exemplary auxiliary microphone power-up/power-down control and auxiliary microphone status detection, in accordance with an embodiment of the invention. Referring to FIG. 6B, there is shown timing diagrams of the signals AUX_MIC_POWER 612, MEASURE 614, EN1 616, and EN2 618 for a probe cycle when the signal MEASUREMENT_INTERVAL_CONTROL 610 is deasserted. At time instant T0, the signal AUX_MIC_POWER 612 may be asserted. There may be a delay from time instance T0 to time instant T1 where the delay may be a programmable value by, for example, the processor 320. At time instant T1, the signal MEASURE 614 may be asserted. The assertion of the signal MEASURE 614 may lead to assertion of the signal EN1 616. Accordingly, the accumulator block 512 may start accumulation of the ΔΣ data from the ADC block 412. At time instance T2, the signals AUX_MIC_POWER 612, MEASURE 614, and EN1 616 may be deasserted. Accordingly, the accumulator block 512 may output the accumulated data.

Figure 7:
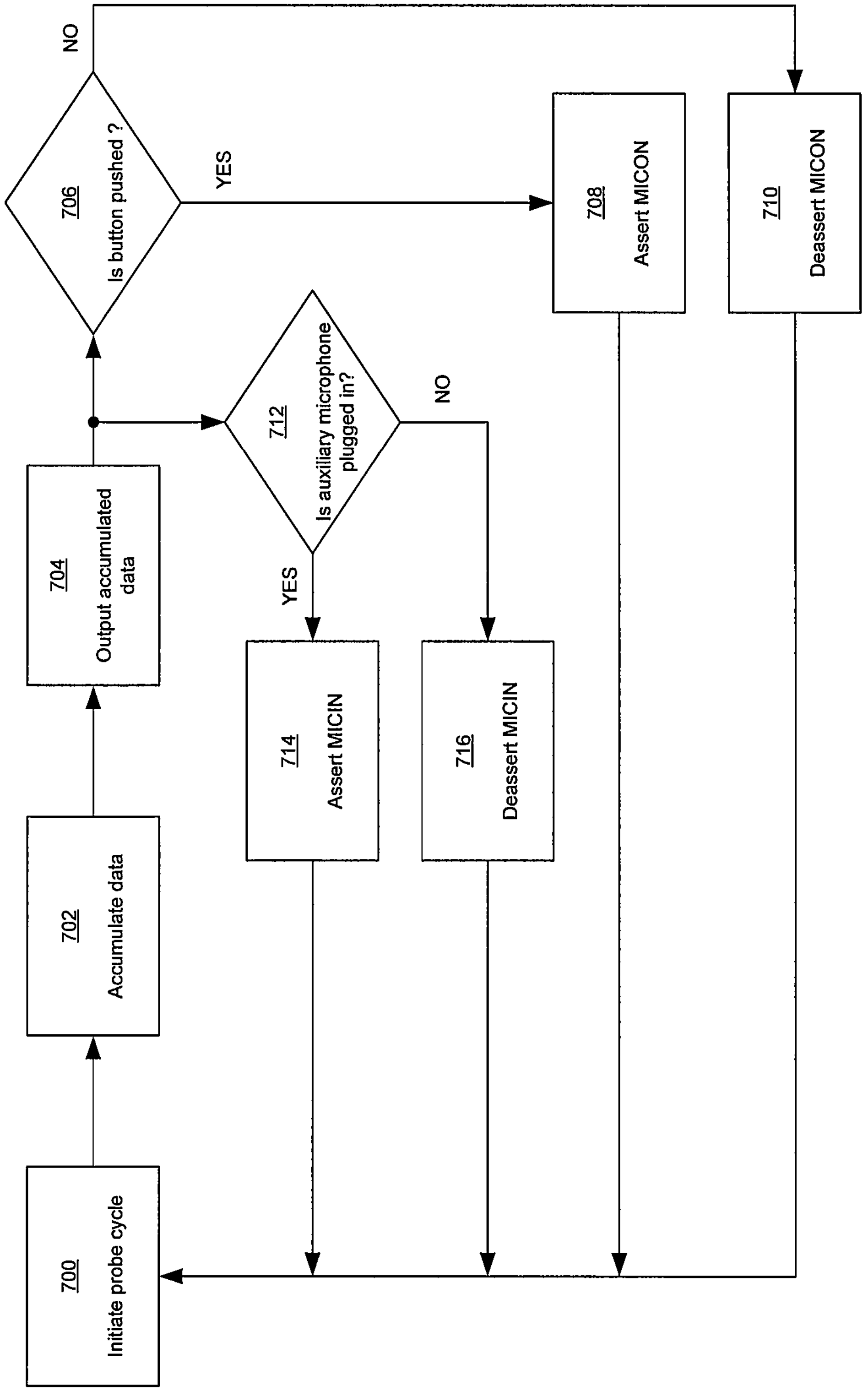
FIG. 7 is an exemplary flow diagram for detecting an auxiliary microphone and controlling power to the auxiliary microphone, in accordance with an embodiment of the invention.

FIG. 7 is an exemplary flow diagram for detecting an auxiliary microphone and controlling power to the auxiliary microphone, in accordance with an embodiment of the invention. Referring to FIG. 7, there is shown steps 700 to 716. In step 700, a probe cycle may be initiated by the microphone detection block 304. In step 702, the accumulator blocks 512 and 514 may accumulate data when the signals EN1 and EN2, respectively, are asserted. In step 704, the accumulated data may be output by the accumulator blocks 512 and 514. The next step may be step 706 and step 712.

In step 706, a determination may be made as to whether the auxiliary microphone button 312 may have been pushed. If it is determined that the auxiliary microphone button 312 may have been pushed, the signal MICON may be asserted in step 708. Otherwise, the signal MICON may be deasserted in step 710. The next step from the steps 708 and 710 may be step 700. In step 712, a determination may be made as to whether the auxiliary microphone 310 may be plugged in. If it is determined that the auxiliary microphone 310 is plugged in, the signal MICIN may be asserted in step 714. Otherwise, the signal MICIN may be deasserted in step 716. The next step from the steps 714 and 716 may be step 700.

In accordance with an embodiment of the invention, aspects of an exemplary system may comprise the auxiliary microphone detection block 304 that may enable intermittent generation of a bias signal by the microphone bias block 302. The auxiliary microphone detection block 304 may receive 1-bit digital samples from the microphone bias block 302. The auxiliary microphone detection block 304 may process the 1-bit digital samples to determine whether an auxiliary microphone may be plugged in to, for example, the mobile device 300. The auxiliary microphone detection block 304 may use a clock whose frequency may be varied in processing the 1-bit digital samples from the microphone bias block 302.

The auxiliary microphone detection block 304 may accumulate the 1-bit digital samples via the accumulator block 512 and the accumulator block 514. The auxiliary microphone detection block 304 may generate a summed value by adding the accumulated output from the accumulator block 512 to the accumulated output from the accumulator block 514. The auxiliary microphone detection block 304 may use the comparator block 520 to compare the summed value to a threshold value to determine whether the auxiliary microphone 310 is the plugged in to the mobile device 300.

The auxiliary microphone detection block 304 may also process the 1-bit digital samples to determine if the auxiliary microphone button 312 may have been pushed, or otherwise activated. The processing may comprise generating a first combined value and a second combined value. The first combined value may be derived by subtracting an output of the combiner block 512 that may have been delayed by the delay block 516 from the output of the combiner block 512. The second combined value may be derived by subtracting the output of the combiner block 512 that may have been delayed by the delay block 516 from an output of the combiner block 514. The maximum detection block 518 may output the larger of the first combined value and the second combined value. The comparator block 522 may compare the output of the maximum detection block 518 to a threshold value for determining whether the auxiliary microphone button 312 may have been pushed.

Another embodiment of the invention may provide a machine-readable storage, having stored thereon, a computer program having at least one code section executable by a machine, thereby causing the machine to perform the steps as described above for detecting and powering-up/powering-down an auxiliary microphone.

While specific embodiments of the invention may have been described for exemplary purposes, the invention need not be limited so. For example, various embodiments of the invention may use a CONTINUOUS_MEASURE signal that may be asserted to allow, for example, continuous reads of the MICINVAL and MICONVAL data during a measurement interval, where there may not be a gap, or a power-down period, between two successive measurement intervals. Since MICON may be generated by reading the differences, the firmware 322*a* may store some history of the MICONVAL and MICINVAL data to decide if the auxiliary microphone button 312 may have been pushed.

Some embodiments of the invention may also control a duration of integration by, for example, the accumulator blocks 512 and 514. The duration of integration may be indicated by, for example, data communicated by the processor 320. Some embodiments of the invention may allow the processor 320 to write to register blocks, such as, for example, the register block 304*a*. Additionally, while various embodiments of the invention may have been described for a mobile device, the invention need not be so limited. For example, exemplary embodiments of the invention may be used for a stationary device, whether wired or wireless.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals, the method comprising:

intermittently enabling a bias circuit to provide a bias signal;

receiving a signal from said bias circuit;

processing said received signal to determine whether an auxiliary microphone is communicatively coupled to a mobile device;

processing said received signal to determine if a button associated with said auxiliary microphone is activated; and accumulating said received signal by a first accumulator and by a second accumulator, wherein:

said received signal is a digital signal; and said processing comprises selecting a larger of a first combined value and a second combined value;

said first combined value comprises a difference of said output of said first accumulator and a delayed said output of said first accumulator; and said second combined value comprises a difference of said delayed said output of said first accumulator and an output of said second accumulator.

2. The method according to claim 1, comprising varying a probe cycle by varying a clock frequency utilized to process said signal received from said bias circuit, wherein said probe cycle is a period of time during which said mobile device is enabled to determine one or both of:

whether said auxiliary microphone is plugged in; and whether a button of said auxiliary microphone button is pushed.

3. The method according to claim 1, wherein said digital signal comprises 1-bit samples.

4. The method according to claim 1, comprising generating a summed value by adding an accumulated output from said first accumulator to an accumulated output from said second accumulator.

5. The method according to claim 4, comprising comparing said summed value to a threshold value to determine whether said auxiliary microphone is communicatively coupled to said mobile device.

6. The method according to claim 1, comprising comparing said larger of said first combined value and said second combined value to a threshold value to determine whether said button associated with said auxiliary microphone is activated.

7. A non-transitory machine-readable storage having stored thereon, a computer program having at least one code section for processing signals, the at least one code section being executed by a machine for causing the machine to perform steps comprising:

intermittently enabling a bias circuit to provide a bias signal;

receiving a signal from said bias circuit;

processing said received signal to determine whether an auxiliary microphone is communicatively coupled to a mobile device;

processing said received signal to determine if a button associated with said auxiliary microphone is activated;

accumulating said received signal by a first accumulator and by a second accumulator, wherein:

said received signal is a digital signal;

said processing comprises selecting a larger of a first combined value and a second combined value;

said first combined value comprises a difference of said output of said first accumulator and a delayed said output of said first accumulator; and said second combined value comprises a difference of said delayed said output of said first accumulator and an output of said second accumulator.

8. The non-transitory machine-readable storage according to claim 7, wherein the at least one code section comprises code for varying a probe cycle by varying a clock frequency utilized to process said signal received from said bias circuit, wherein said probe cycle is a period of time during which said mobile device is enabled to determine one or both of:

whether said auxiliary microphone is plugged in; and whether a button of said auxiliary microphone button is pushed.

9. The non-transitory machine-readable storage according to claim 7, wherein said digital signal comprises 1-bit samples.

10. The non-transitory machine-readable storage according to claim 7, wherein the at least one code section comprises code for generating a summed value by adding an accumulated output from said first accumulator to an accumulated output from said second accumulator.

11. The non-transitory machine-readable storage according to claim 10, wherein the at least one code section comprises code for comparing said summed value to a threshold value to determine whether said auxiliary microphone is coupled to said mobile device.

12. The non-transitory machine-readable storage according to claim 7, wherein the at least one code section comprises code for comparing said larger of said first combined value and said second combined value to a threshold value for said determining whether said button associated with said auxiliary microphone is activated.

13. A system for processing signals, the system comprising:

a detection circuit that enables a bias circuit to provide of an intermittent bias signal;

said detection circuit is enabled to receive of a signal from said bias circuit; and said detection circuit enables processing of said received signal to determine whether an auxiliary microphone is communicatively coupled to a mobile device, wherein:

said received signal is a digital signal;

said detection circuit accumulates said digital signal with a first accumulator and with a second accumulator;

said detection circuit processes said received digital signal to determine if a button associated with said auxiliary microphone is activated; and said processing comprises selecting a larger of a first combined value and a second combined value, wherein said first combined value comprises a difference of said output of said first accumulator and a delayed said output of said first accumulator, and said second combined value comprises a difference of said delayed said output of said first accumulator and an output of said second accumulator.

14. The system according to claim 13, wherein:

said one or more circuits are operable to vary a probe cycle by varying a clock frequency utilized to process said signal received from said bias circuit; and said probe cycle is a period of time during which said mobile device is enabled to determine one or both of:

whether said auxiliary microphone is plugged in; and whether a button of said auxiliary microphone button is pushed.

15. The system according to claim 13, wherein said digital signal comprises 1-bit samples.

16. The system according to claim 13, wherein said one or more circuits are operable to generate a summed value by adding an accumulated output from said first accumulator to an accumulated output from said second accumulator.

17. The system according to claim 16, wherein said one or more circuits are operable to compare said summed value to a threshold value to determine whether said auxiliary microphone is coupled to said mobile device.

18. The system according to claim 13, wherein said detection circuit compares said larger of said first combined value and said second combined value to a threshold value to determine whether said button associated with said auxiliary microphone is activated.

* * * * *